United States Patent
Yamin

(10) Patent No.: US 10,770,715 B2
(45) Date of Patent: Sep. 8, 2020

(54) HIGH CAPACITY PRIMARY LITHIUM CELLS AND METHODS OF MAKING THEREOF

(71) Applicant: Tadiran Batteries Ltd., Kiryat Ekron (IL)

(72) Inventor: Herzel Yamin, Ganie Yohanan (IL)

(73) Assignee: Tadiran Batteries Ltd., Kiryat Ekron (IL)

( * ) Notice: Subject to any disclaimer, the term of this patent is extended or adjusted under 35 U.S.C. 154(b) by 135 days.

(21) Appl. No.: 16/021,138

(22) Filed: Jun. 28, 2018

(65) Prior Publication Data

US 2020/0006746 A1   Jan. 2, 2020

(51) Int. Cl.
| | | |
|---|---|---|
| *H01M 4/12* | (2006.01) | |
| *H01M 4/38* | (2006.01) | |
| *H01M 4/525* | (2010.01) | |
| *H01M 8/0202* | (2016.01) | |
| *H01M 10/04* | (2006.01) | |

(52) U.S. Cl.
CPC ............. *H01M 4/12* (2013.01); *H01M 4/382* (2013.01); *H01M 4/525* (2013.01); *H01M 8/0202* (2013.01); *H01M 10/0459* (2013.01)

(58) Field of Classification Search
CPC .... H01M 4/382; H01M 4/525; H01M 8/0202; H01M 10/0459
See application file for complete search history.

(56) References Cited

U.S. PATENT DOCUMENTS

| | | | | |
|---|---|---|---|---|
| 5,188,909 A | * | 2/1993 | Pedicini | H01M 2/34 429/171 |
| 9,484,571 B2 | * | 11/2016 | Voillequin | H01M 4/136 |
| 2015/0171396 A1 | * | 6/2015 | Okuno | B60L 58/15 701/22 |
| 2017/0062869 A1 | * | 3/2017 | Zhamu | H01M 2/1653 |

* cited by examiner

*Primary Examiner* — Robert S Jones
*Assistant Examiner* — Rachel L Zhang

(57) ABSTRACT

A high capacity primary electrochemical lithium cell includes an anode comprising metallic lithium, a hybrid cathode comprising a liquid $SO_2$ cathode and a solid cathode including a cathode material characterized by having a first electromotive force (EMF) when coupled to a metallic lithium anode. The first EMF is greater than a second EMF of a cell having a metallic lithium anode and a liquid $SO_2$ cathode. A separator may separate the anode from the solid cathode. The cell includes an electrolyte solution including at least one ionizable salt dissolved in at least one organic solvent. The solid cathode material may include carbon monofluoride ($CF_x$), a transition metal oxide, a mixture of two or more transition metal oxides or any combinations of such cathode materials. The solid cathode may also include a binder and a carbon based conductive material.

20 Claims, No Drawings

HIGH CAPACITY PRIMARY LITHIUM CELLS AND METHODS OF MAKING THEREOF

FIELD AND BACKGROUND OF THE INVENTION

The present invention, in some embodiments thereof, relates to primary lithium electrochemical cells more particularly, but not exclusively, to primary lithium cells including a combination of a liquid $SO_2$ cathode and an electrochemically compatible solid cathode.

There are several main commercial primary lithium electrochemical cells in market: Lithium Thionyl chloride (Li/$SOCl_2$), Lithium Sulfuryl chloride (Li/$SO_2Cl_2$), Lithium Sulfur-dioxide (Li/$SO_2$), Lithium Manganese dioxide (Li/$MnO_2$), Lithium carbon monofluoride (Li/$CF_x$) and Lithium Iron sulfide (Li/$FeS_2$). A metallic lithium anode is common in all the above systems while the cathode material is different. The first three systems are known as liquid cathode systems while the last three systems are known as solid cathode systems.

In the liquid cathode systems the cathode material is in liquid state. During the cell's discharge the liquid cathode transfers the electricity to a porous high surface area conductive current collector. In the solid cathode systems, the cathodic active material is usually in the form of a solid that is mechanically attached to the current collector to conduct the current.

The electromotive force (EMF) of these systems is markedly different. The Li/$SO_2Cl_2$ system has an EMF of about 3.9V. The Li/$SOCl_2$ system has an EMF of about 3.7V. The Li/$MnO_2$ and the Li/$CF_x$ systems have an EMF of about 3.1V. The Li/$SO_2$ has an EMF of about 3.1V. The Li/$FeS_2$ system has an EMF of about 1.8V In all the above mentioned lithium systems, during cell discharging, electrons are transferred in the external circuit from the negative pole of the cell to the positive pole. The anode is oxidized to lithium ions while the cathodic material is reduced and changes its valence to a lower state. Inside the cell, the lithium ions move from the anode side to the cathode side to naturalize the charge.

For example, in the Li/$MnO_2$ system, during discharging of the cell, electrons are transferred from the lithium anode through the external circuit. The electrons are transferred through the positive pole of the cell to the manganese dioxide cathode to reduce the manganese which changes its valence from +4 to +3. Inside the cell, the lithium metal is oxidized to lithium ions that move within the electrolyte filling the cell and penetrate the cathode to balance the charge of the reduced manganese.

A similar type of mechanism occurs in the liquid cathode primary systems. For example, in the Li/$SO_2$ liquid cathode system, during the discharging of the cell, electrons are transferred from the lithium anode through the external circuit (the load). The electrons are transferred through the positive pole of the cell to the $SO_2$ cathodic material and reduces the $SO_2$ to $S_2O_4^{-2}$ ions, changing the valence of sulfur from +4 (in $SO_2$) to +3 (in $S_2O_4^{-2}$) Lithium ions move from the anode side to the cathode side and combine with $S_2O_4^{-2}$ ions to form solid $Li_2S_2O_4$ that is deposited on the porous current collector.

The electrolyte of the Li/$SO_2$ and the Li/$MnO_2$ systems contains lithium salts that are dissolves in an organic solvent or a mixture of organic solvents to form a conducting solution that conducts the electricity inside the cell. For the Li/$SO_2$ cell, the electrolyte typically includes acetonitrile (AN) as a solvent and Lithium bromide (LiBr) as the ionizable salt. In the Li/$MnO_2$ system, the electrolyte may typically contains propylene carbonate (PC) as the solvent and lithium perchlorate (LiClO$_4$) as the conducting salt.

In Li/$SO_2$ liquid cathode cells, the cathode active material ($SO_2$) is dissolved in the AN solvent while in the Li/$MnO_2$ cell the solid manganese dioxide is blended as solid inside a porous current collector.

As lithium metal is a very reactive material, it may spontaneously react with the liquid inside the cell. The metallic lithium may react either with the solvent of the electrolyte solution or with the liquid cathode material ($SO_2$). For example, during the production process of a Li/$SO_2$ cell, as soon as the liquid cathode solution is injected into the cell, the metallic lithium anode spontaneously reacts with $SO_2$ to form a $Li_2SO_2O_4$ film that is precipitated on the anode and is known as a solid electrolyte interphase (SEI). The SEI prevents further reaction of the $SO_2$ with the lithium anode.

Similarly, as the electrolyte is injected into a cell of the solid cathode systems, metallic lithium of the anode may react with the PC solvent to form an insoluble $Li_2CO_3$ passivation layer on the anode that prevents further reaction of the lithium with the solvent.

In contrast to the Li/$MnO_2$ system, the SEI of Li/$SO_2$ cells is formed by the reaction of lithium with the $SO_2$ and not with the AN solvent. The reaction of lithium with $SO_2$ is thermodynamically preferred over the reaction between lithium and the solvent AN. In the absence of $SO_2$ (such as for example, in unbalanced Li/$SO_2$ cells having an excess of lithium in the anode, when the cell is fully discharged) a reaction of lithium with AN may forms toxiclithium cyanide (LiCN) and hydrogen cyanide (HCN) gas-. Therefore, excess of $SO_2$ is usually required.

The electrical capacity ratio of lithium metal to $SO_2$ has to be kept in an adequate manner. When the molar ratio of lithium to $SO_2$ is above unity (Li/$SO_2$>1.0) at the end of discharge, all $SO_2$ is consumed and a reaction between lithium metal and AN may result leading to formation of LiCN and HCN gas that may rupture the cell. Due to this limitation $SO_2$ must be in excess and the capacity of the cell is limited to a certain value depending on cell size.

The primary Li/$SO_2$ system is a relatively a mature technology. The approximate capacity of a typical standard D size Li/$SO_2$ cell is about 7.5 Ah. Despite some improvements in cell properties, this charge capacity remained almost the same for the last 30 years.

SUMMARY OF THE INVENTION

There is therefore provided in accordance with some embodiments of the cells of the present application, a primary electrochemical lithium cell. The cell includes an anode including metallic lithium therein.

The cell also includes a cathode including a liquid $SO_2$ cathode and a solid cathode comprising a cathode material characterized by having a first electromotive force (EMF) when coupled to a metallic lithium anode. The first EMF is greater than a second EMF of a cell having a metallic lithium anode and a liquid $SO_2$ cathode. The cell also includes an electrolyte solution including at least one ionizable salt dissolved in at least one organic solvent. The cell also includes a separator disposed between the anode and the solid cathode of the cell.

In some embodiments of the cells of the present application, the second EMF is in the range of 2.9-3.1 Volt.

In some embodiments of the cells of the present application, the cathode material of the solid cathode is selected from, carbon monofluoride ($CF_X$), a transition metal oxide, a mixture of two or more transition metal oxides and any combinations thereof.

In some embodiments of the cells of the present application, the transition metal oxide is selected from the list consisting of $MnO_2$, $CoO_2$, $NiO_2$, $V_2O_5$.

In some embodiments of the cells of the present application, the solid cathode includes a mixture of $CF_X$ with one or more transition metal oxides, and the weight of the $CF_X$ is in the range of 10%-45% of the total weight of the cathode material of the solid cathode.

In some embodiments of the cells of the present application, the solid cathode material includes $CF_X$ and the energy density of the primary cell exceeds 215 Wh/Kg and/or exceeds 395 Wh/liter.

In some embodiments of the cells of the present application, the solid cathode material includes a mixture of $CF_X$ and $MnO_2$ and the energy density of the primary cell exceeds 215 Wh/Kg and/or exceeds 395 Wh/liter.

In some embodiments of the cells of the present application, the solid cathode material includes $MnO_2$ and the energy density of the primary cell exceeds 215 Wh/Kg and/or exceeds 395 Wh/liter.

In some embodiments of the cells of the present application, the cathode and the anode each include a current collector.

In some embodiments of the cells of the present application, the solid cathode also includes a carbon based material and a binder material.

In some embodiments of the cells of the present application, the binder material is selected from polyvinylidene fluoride (PVDF) or polytetrafluoroethylene (PTFE) and any combinations thereof.

In some embodiments of the cells of the present application, the carbon based material is selected from, acetylene carbon black, graphite and ketchen black and any combinations thereof.

In some embodiments of the cells of the present application, the at least one ionizable salt is selected from LiBr, $LiClO_4$ and any combination thereof.

In some embodiments of the cells of the present application, the at least one organic solvent is Acetonitrile (AN).

In some embodiments of the cells of the present application, the cell is selected from a "Jelly Roll" type cell, a wafer type cell, a bobbin type cell and a prismatic type cell.

In some embodiments of the cells of the present application, the separator is selected from a polypropylene separator and a polyethylene separator and any combinations thereof.

In some embodiments of the cells of the present application, the first EMF is in the range of 3.0-4.5 Volt.

There is also provided, in accordance with some embodiments of the methods of the present application, a method for constructing a primary electrochemical cell. The method includes the steps of providing an anode including a current collector and metallic lithium, providing a cathode including a current collector and a cathode material including a solid material characterized by having a first electromotive force (EMF) when coupled to a metallic lithium anode, the first EMF is greater than a second EMF of a cell having a metallic lithium anode and a liquid $SO_2$ cathode, inserting the anode and the cathode with a separator interposed therebetween into a canister, injecting into the canister under vacuum a mixture of liquid $SO_2$, and an electrolyte solution comprising at least one ionizable salt and at least one organic solvent, and hermetically sealing the cell after the step of injecting.

In accordance with some embodiments of the method, the second EMF is in the range of 2.9-3.1 Volt.

In accordance with some embodiments of the method, the cathode material of the solid cathode is selected from, carbon monofluoride ($CF_X$), a transition metal oxide, a mixture of two or more transition metal oxides and any combinations thereof.

In accordance with some embodiments of the method, the transition metal oxide is selected from the list consisting of $MnO_2$, $CoO_2$, $NiO_2$, $V_2O_5$.

In accordance with some embodiments of the method, the solid cathode includes a mixture of $CF_X$ with one or more transition metal oxides, and the weight of the $CF_X$ is in the range of 10%-45% of the total weight of the cathode material of the solid cathode.

In accordance with some embodiments of the method, the solid cathode material includes $CF_X$ and wherein the energy density of the primary cell exceeds 215 Wh/Kg and/or exceeds 395 Wh/liter.

In accordance with some embodiments of the method, the solid cathode material includes a mixture of $CF_X$ and $MnO_2$ and the energy density of the primary cell exceeds 215 Wh/Kg and/or exceeds 395 Wh/liter.

In accordance with some embodiments of the method, the solid cathode material is $MnO_2$ and the energy density of the primary cell exceeds 215 Wh/Kg and/or exceeds 395 Wh/liter.

In accordance with some embodiments of the method, the cathode and the anode each include a current collector.

In accordance with some embodiments of the method, the solid cathode also includes a carbon based material and a binder material.

In accordance with some embodiments of the method, the binder material is selected from polyvinylidene fluoride (PVDF) and polytetrafluoroethylene (PTFE).

In accordance with some embodiments of the method, the carbon based material is selected from, acetylene carbon black, graphite, Ketchen black and any combinations thereof.

In accordance with some embodiments of the method, the at least one ionizable salt is selected from LiBr, $LiClO_4$ and any combinations thereof.

In accordance with some embodiments of the method, the at least one organic solvent is Acetonitrile (AN).

In accordance with some embodiments of the method, the cell is a "Jelly Roll" type cell and wherein the step of inserting includes separating the cathode and the anode by the separator, and rolling the anode, cathode and separator combination prior to the step of inserting.

In accordance with some embodiments of the method, the cell is selected from a "Jelly Roll" type cell, a wafer type cell, a bobbin type cell and a prismatic type cell.

In accordance with some embodiments of the method, the separator is selected from a polypropylene separator, a polyethylene separator and any combinations thereof.

In accordance with some embodiments of the method, the first EMF is in the range of 3.0-4.5 Volt.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention may involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

DESCRIPTION OF SPECIFIC EMBODIMENTS OF THE INVENTION

Abbreviations

The following abbreviations are used throughout the present application:

| Abbreviation | Meaning |
| --- | --- |
| μm | micrometer |
| AN | Acetonitrile |
| cm | centimeter |
| $cm^2$ | Square centimeter |
| DMC | Dimethyl carbonate |
| EMF | Electromotive force |
| g | gram |
| Kg | Kilogram |
| L | Liter |
| Li | Metallic Lithium |
| Li+ | Lithium Ion |
| mA | milliampere |
| mm | millimeter |
| OCV | Open Cell Voltage |
| PC | Propylene carbonate |
| PTFE | Polytetrafluoroethylene |
| PVDF | Polyvinylidenefluoride |
| SO2 | Sulfur dioxide |
| THF | Tetrahydrofuran |
| V | Volt |
| Wh | Watt hour |

The present application discloses a new type of primary lithium/$SO_2$/X electrochemical cell having a markedly increased capacity and energy density as compared to prior art primary liquid cathode Li/$SO_2$ cells.

The new type of cells disclosed herein have a lithium anode and a hybrid cathode including a liquid $SO_2$ cathode and a solid cathode material X having an EMF (of the corresponding Li/X anode/cathode couple) higher than the EMF of the Li/$SO_2$ anode/cathode couple).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways. It is expected that during the life of a patent maturing from this application many relevant electrochemically suitable solid cathodes will be developed and the scope of the terms "solid cathode" and "solid cathode material" are intended to include all such new technologies a priori. As used herein the term "about" refers to ±10%. The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

The term "hybrid cell" is used throughout the specification and the claims hereinafter to mean an electrochemical cell having a metallic lithium anode and a combination of a liquid $SO_2$ cathode and a solid cathode including a solid cathode active material. The cell includes an electrolyte solution including a suitable ionizable salt dissolved in one or more organic solvents (which also includes the $SO_2$ dissolved in the solvent). Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It was serendipitously discovered by the inventors of the present application that it is possible to substantially increase the capacity of liquid cathode Li/$SO_2$ system cells by incorporation of a solid cathode material in the liquid cathode cells. The liquid and the solid cathodic materials can be reduced simultaneously during the discharge provided that a proper ratio between the EMF of the liquid cathode and the EMF of the solid cathode is kept.

Generally speaking, from thermodynamic considerations, when a liquid cathode and a solid cathode are present in the same cell having a metallic lithium anode, the cathode material with a higher EMF value will react preferentially to the cathode material of the lower EMF value, unless the first reaction is kinetically hindered. When the difference in the EMF value between the two different cathode materials is too high, separate discharge steps are expected. The discharge curve has two plateaus. A first plateau is expected for the high EMF anode/cathode couple and a second plateau is expected for the lower EMF anode/cathode couple. When the EMF of the two anode/cathode couples is too close, one single curve is expected with a gradual voltage change over the discharge time.

Therefore, incorporation of a $MnO_2$ solid cathode (having an EMF of 3.2V) into a $Li/SOCl_2$ cell (having an EMS of 3.7V) will not give any capacity gain in the cell in comparison to a cell having $SOCl_2$ as the sole cathode. Since the EMF of the $Li/SOCl_2$ anode/cathode couple is substantially higher than $Li/MnO_2$ anode cathode couple and in addition the $SOCl_2$ is a sole solvent that serves dual role as cathode material and as a solvent to transport the ions, it is preferable in this case to use the sole cathode only with the higher EMF. The same rational holds for the $Li/CF_x$ anode/cathode couple and the $Li/FeS_2$ couple. The difference in the voltages is so high that it is better to use just $CF_x$. The same rational holds for liquid cathode $SOCl_2$ and solid cathode $FeS_2$.

Similarly, a cell with a combination liquid $SO_2$ cathode and a solid $FeS_2$ cathode will show two voltage plateaus during cell discharging. During the first voltage plateau Li and $SO_2$ are the active couple but after consumption of the $SO_2$, the undesirable reactions of the metallic lithium with the AN solvent is expected. So this combination cannot yield a practical cell.

Thus, a combination of a liquid $SO_2$ cathode with $MnO_2$ solid cathode material in a cell or a combination of a liquid $SO_2$ cathode with $CF_x$ solid cathode material is expected to give a significantly higher capacity than the capacity of a prior art $Li/SO_2$ cell.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The solvents described in the examples below were lithium battery grade materials obtained from BASF SE, Germany, the $MnO_2$ was obtained from Tronox Ltd., USA, the $CF_x$ is commercially available from Advanced Research Chemicals (ACR), USA.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1: A Prior Art $Li/SO_2$ Cell

A standard D size $Li/SO_2$ cell was fabricated. The anode of the cell consists of lithium metal foil having a thickness of 170 µm a length of 650 mm and a width of 39 mm. The current collector was a copper strip having a thickness of 75 µm and a width of 3 mm. The total weight of lithium in the anode was 2.2 g. The geometrical surface area of anode was about 510 $cm^2$.

The cell's cathode was made from a mixture of 95% percent (by weight) of acetylene black carbon and 5% (by weight) PTFE binder on a sheet of aluminum expanded metal as current collector. The geometrical dimensions of the cathode were 700 mm length, 41 mm width and 750 µm thickness. The porosity of the cathode was about 80%. Prior to cell assembly, the cathode was dried for eighteen (18) hours under vacuum at 130° C. in a dry room. An aluminum tab was welded to the aluminum expanded metal sheet as an electrical contact.

A micro-porous polypropylene separator separated between anode and cathode. The electrodes together with the separator were spirally wound in the jelly-roll configuration and inserted into a D size nickel plated cold rolled steel canister serving as the negative pole. The cell's cover was made from nickel plated cold rolled steel and a molybdenum positive pole. Glass to metal seal (GTMS) separated between the positive pole and the negative pole of the cell. The anode tab was welded to the negative pole and the cathode aluminum tab was welded to the positive pole of the cell. The can and cover are mechanically closed and welded together using a cirrocumulus welding laser. The electrolyte solution of the cell included 1 molar of lithium bromide (LiBr) dissolved in a mixture of liquid $SO_2$ and acetonitrile (AN) in a ratio of 4:1 by weight, respectively. The electrolyte solution was injected into the cell in vacuum through the molybdenum pole tube and the cell was hermetically sealed. The cell open circuit voltage (OCV) reached 3.16V after about 24 hours. The OCV stabilized at 3.10V after 10 days of storage at room temperature. The cell was discharged under a constant current of 250 mA to a 2.0V cutoff. The cell's capacity was 7.4 Ah delivered after about 30 hours of continuous discharge.

Example 2: Prior Art $Li/MnO_2$ Cell

The constructed cell was a standard D size cell and the cell's canister and cover were identical to the can and cover disclosed in EXAMPLE 1 above. The anode had the same construction and the same length and width as described in EXAMPLE 1 except that the thickness of the anode was 270 µm and the weight of the lithium in the anode was 3.7 g.

The cathode material included a mixture of 87% (by weight) of electrochemical manganese dioxide (EMD) ($MnO_2$), 10% (by weight) of conductive carbon and 3% polyvinylidene fluoride PVDF. The current collector was identical to the expanded aluminum metal current collector used in EXAMPLE 1. The length and the width of the cathode were identical to those in EXAMPLE 1. The thickness of the cathode was 680 µm. The total weight of $MnO_2$ was 54 g and the porosity of the cathode was about 40%. The cathode was dried in a vacuum at 250° C. prior to cell assembly. The electrolyte solution was a 1 molar lithium perchlorate ($LiClO_4$) dissolved in a solvent containing a mixture of PC:THF (1:1 by volume, respectively).

The porous polypropylene separator used was similar to the separator used in EXAMPLE 1. The cell assembly was performed as disclosed for the cell of EXAMPLE 1. The cell was filled with the electrolyte solution in a vacuum after the laser welding as disclosed for the cell of EXAMPLE 1. After the electrolyte insertion, the cell was hermetically sealed by welding. The OCV of the cell started at 3.38V and stabilized at 3.25V about 10 days after electrolyte filling. The cell was discharge at a constant current of 250 mA to a 2.0V cut off. The cell delivered a capacity of 11.7 Ah.

Example 3: Hybrid Cell with Solid $MnO_2$ Cathode and $SO_2$ Liquid Cathode

A standard D size cell was constructed with a canister and a cover identical to those of EXAMPLE 1. The cell's anode was a metallic lithium cathode having the same construction and materials as disclosed for EXAMPLE 1 and EXAMPLE 2 hereinabove, except that the weight of the lithium use in the anode construction was 4.4 gram and the thickness of the lithium foil was 330 μm. The cell's cathode had a similar construction as in EXAMPLE 2, except that the thickness of the cathode and the cathode's porosity were lower than those of the cathode of EXAMPLE 2 to cope with the increase in the thickness of the anode and the expected cell capacity. The thickness of the cathode was 610 μm. The cell was filled with 16.8 g of an electrolyte solution including 1 molar LiBr in a mixture of 4:1 by weight of $SO_2$:AN, respectively. The OCV of the hybrid cell was 3.35V after 24 hours and stabilized at 3.28V after 10 days of storage at room temperature. The cell was discharged at a constant current of 250 mA to a 2.0V cut off. The hybrid cell delivered a capacity of 15.2 Ah.

It is clear that in EXAMPLE 3 the liquid $SO_2$ cathode together with the solid $MnO_2$ cathode contribute to the discharge capacity of the cell. It can be shown that 9.8 Ah was delivered by the solid cathode and 5.4 Ah was delivered by the liquid $SO_2$ cathode. The increase in the capacity of example results from the capacities of the $SO_2$ material and the solid cathode $MnO_2$.

Example 4: Hybrid Cell with Solid $CF_X$ Cathode and Liquid $SO_2$ Cathode

A standard D size cell was fabricated as in EXAMPLE 2 except that the solid $MnO_2$ cathode was replaced by a $CF_X$ solid cathode and the quantity of lithium metal in the anode was increased to balance the total capacity of the cathode that is the sum of the solid cathode capacity and the liquid $SO_2$ cathode capacity. The length of the anode was 650 mm, the width of the anode was 39 mm and the thickness of the anode was 390 μm. The total weight of lithium metal in the anode was about 5.2 g.

The cathode consisted of a mixture of 87% by weight of carbon monofluoride $CF_X$, 10% by weight conductive carbon and 3% by weight PVDF.

The length of the cathode was 700 mm, the width of the cathode was 41 mm and the thickness of the cathode was 560 μm. The porosity of cathode material was calculated to be 42% and the $CF_X$ weight was 22 g. The electrolyte solution had the same composition as the electrolyte solution of EXAMPLE 1. (1 molar LiBr dissolved in $SO_2$:AN mixture of 4:1 by weight). The total weight of electrolyte solution was 13 g. The porous polypropylene separator was identical to the separator of EXAMPLE 1. The cell was assembled in a similar manner as described for EXAMPLE 1 and filled with cell electrolyte in a vacuum after the s of the laser welding. After the electrolyte insertion the cell was hermetically sealed by welding. The OCV of the cell started at 3.43V and stabilized at 3.32V at about 14 days of storage at room temperature after electrolyte solution filling. The cell was discharged at a 250 mA constant current to a 2.0V cut off. The cell delivered a capacity of 18.3 Ah. it was calculated that about 14.5 Ah of the cell's capacity came from the solid $CF_X$ and about 3.8 Ah from the liquid $SO_2$.

Example 5: Hybrid Cell with a Mixture of Two Solid Cathode Materials and a Liquid $SO_2$ Cathode As $CF_X$ material is much more expensive than EMD $MnO_2$, a mixture of $MnO_2$ and $CF_X$ was used in this example. A standard D size cell was constructed. The canister and cell cover were identical to those used in EXAMPLE 1 above. The cell construction method was similar to that of EXAMPLE 4 above, except that the solid cathode material was a mixture of $MnO_2$ and $CF_X$ in a ratio of 5:1 (by weight). The anode length and width were similar to example 4 but the thickness of the lithium foil was just 340 μm and the total weight of lithium metal in the anode was 4.8 g. The cathode length was 700 mm and it thickness was 590 μm. The net weight of $CF_X$ in the cathode was 7.7 g and the net weight of $MnO_2$ was 34.5 g.

The electrolyte solution was the same composition as in EXAMPLE 1. (1 molar LiBr in a mixture of 4:1 by weight of $SO_2$:AN). The total weight of the electrolyte solution in the cell was 13 g. The porous polypropylene separator was similar to that used in EXAMPLE 1. The cell was assembled in a similar manner as described for EXAMPLE 1. The cell was filled with the electrolyte solution under vacuum after the laser welding of the cover to the canister as disclosed hereinabove. After the electrolyte insertion the cell was hermetically sealed by welding.

The OCV of the cell started at 3.40V and stabilized at 3.30V at 14 days after electrolyte filling. The cell was discharge at a constant current of 250 mA to a 2.0V cut off. The cell delivered a capacity of 16.8 Ah. It was calculated that out of this total cell capacity, 7.7 Ah were delivered by the $MnO_2$ cathode material, 5.3 Ah were delivered by the $CF_X$ cathode material and about 3.8 Ah were delivered by the liquid $SO_2$ liquid cathode.

It was found that as long as an unreduced solid cathode is present in the cell, the $SO_2$ will not be totally consumed. In other words as long as a non-reduced cathode material is present in the cell, $SO_2$ will remain in the solution and no reaction of metallic lithium with the acetonitrile solvent will occur. This finding enables to increase the capacity of the $SO_2$ cell by incorporation of one or more solid cathode materials in addition to the liquid $SO_2$ cathode. The $MnO_2$ cathode (when coupled to a metallic Lithium anode) and the $CF_X$ cathode (when coupled to a metallic lithium anode) are found to have higher EMF than the EMF of a cell having a liquid $SO_2$ cathode only (when coupled to a metallic lithium anode) and therefore the above two cathode materials are adequate to increase the capacity of the liquid $SO_2$ cathode cell.

On the other hand, a $Li/FeS_2$ solid cathode cell (having a metallic lithium anode) has an EMF lower than the EMF of a cell having a liquid $SO_2$ cathode only (when coupled to a metallic lithium anode) and therefore cannot be used for this application because during the discharge of such a hypothetical cell, after consumption of all $SO_2$, the acetonitrile solvent may react with the lithium metal remaining in the anode leading to the undesirable formation of LiCN and HCN that may result in cell rupture.

As demonstrated in EXAMPLE 3 the incorporation of $MnO_2$ cathode material into a cell having an $SO_2$ cathode in liquid the resulting cell's capacity is increased to beyond 15 Ah in comparison to just 7.5 Ah capacity of a standard liquid $SO_2$ cathode in D size cells.

Moreover, the hybrid cell (having $MnO_2+SO_2$ cathodes) capacity and the energy density of $SO_2$ were increased significantly beyond 7.5 Ah by incorporation of $CF_X$ into the solid cathode of the cell. As the equivalent weight of $CF_X$ is lower than the equivalent weight of $MnO_2$ (for x=1 the equivalent weight of $CF_X$ is 31 as compared to an equivalent weight of 72 for $MnO_2$) the energy density per unit cell weight for a hybrid cell including a liquid $SO_2$ cathode and a solid $CF_X$ cathode material is higher than the energy density of a hybrid cell including a liquid $SO_2$ cathode and a solid cathode material including a mixture of $CF_X$ and $MnO_2$.

TABLE 1 below summarizes some electrochemical properties of prior art $Li/SO_2$ and $Li/MnO_2$ primary cells including some examples of primary lithium batteries commercial available from different manufacturers.

TABLE 1

(prior art cells)

| Cell type | OCV (V) | Energy Density Wh/Kg | Wh/L | Nominal D size cell capacity (Ah) | REMARKS |
|---|---|---|---|---|---|
| $Li/SO_2$ | 2.9 | 255 | 405 | 7.5 | Example 1 |
| $Li/SO_2$ | 2.9 | 215 | 395 | 7.7 | LO26SX Saft |
| $Li/MnO_2$ | 3.1 | 308 | 640 | 12.6 | M-20 Saft |
| $Li/MnO_2$ | 3.1 | 295 | 620 | 11.7 | Example 2 |
| $Li/CF_x$ | 3.0 | 472 | 838 | 16.0 | LCF-129 Eagle Pitcher |

TABLE 2 below summarizes some electrochemical properties of the novel hybrid cells of the present invention.

TABLE 2

| Cell type | OCV (V) | Energy Density Wh/Kg | Wh/L | Nominal D size cell capacity (Ah) | REMARKS |
|---|---|---|---|---|---|
| $Li/(SO_2 + MnO_2)$ | 3.28 | 395 | 770 | 15.2 | Example 3 |
| $Li/(SO_2 + CF_x)$ | 3.32 | 590 | 870 | 18.3 | Example 4 |
| $Li/(SO_2 + CF_x + MnO_2)$ | 3.30 | 450 | 825 | 16.8 | Example 5 |

It may be seen from TABLE 1 and TABLE 2 above that the incorporation of a solid cathodic material into a $Li/SO_2$ liquid cathode cell substantially increases the cells capacity and the energy density of the cell as compared to the standard prior art, as well as compared to a primary lithium cell having only the solid cathode material that was incorporated into the hybrid cathode cell.

Furthermore, while $CF_X$ cathode material is relatively expensive, it is possible to significantly increase the hybrid cell's capacity by including a relatively small amount of $CF_X$ (such as, for example 16.7% $CF_X$ by weight) to a mixed solid cathode material composed of $MnO_2+CF_X$ that is incorporated in a $Li/SO_2$ liquid cathode cell. While the Energy density of such a cell is lower than that of a standard $Li/CF_X$ cell (by about 5%) or that of a hybrid cell $Li/(CF_X+SO_2)$ (by about 23%), it enables to advantageously substantially increase the capacity of the cell at a relatively low cost of manufacturing and makes the $Li/(SO_2+MnO_2+CF_X)$ of EXAMPLE 4 hereinabove quite attractive for applications where the total cell's weight is not an important consideration but cell capacity and cost are important.

It will be appreciated that the hybrid cells disclosed herein are not limited to using the specific solid cathode compositions disclosed in the examples 3-5 above. Rather, many other types of transition metal oxide cathodic materials, different than those given in the examples above, may be successfully used in the hybrid cells of the present invention. Some examples of such cells may include but are not limited to the following systems: $Li/(SO_2+CoO_2)$, $Li/(SO_2+NiO_2)$, $Li/(SO_2+V_2O_5)$, $Li/(SO_2+CoO_2/MoO_2)$, $Li/(SO_2+MnO_2/CF_X)$, $Li/(SO_2+CoO_2/CF_X)$, $Li/(SO_2+NiO_2/CF_X)$, $Li/(SO_2+V_2O_5/CF_X)$.

Furthermore, any solid cathode having a mixture of any type of suitable mixture of transition metal oxides (which in a cell with a metallic lithium anode exhibits an EMF larger than the EMF of the prior art $Li/SO_2$ cell) may be used together with $SO_2$ in the hybrid cathode cells of the present invention. Moreover, such multi metal oxide cathodes may include an amount of $CF_X$ cathode material (typically about 10%-45% by weight) of the cathode material mixture.

Furthermore, it is noted that the type of electrolyte solutions described in the examples hereinabove are not to be regarded as obligatory to practicing the cells of the present invention. It may be possible to use different ionizable salts and/or different types of organic solvents (or solvent mixtures) as long as they are compatible with the $SO_2$ liquid cathode and with the solid cathode being used in the cell.

Furthermore, it is noted that although the experimental cells described in Examples 3-5 above were constructed as a "Jelly Roll" type cell, this is not obligatory to practicing the invention and any other suitable type of cell structure may be used. For example, button type, wafer type, prismatic type and bobbin type hybrid cells may all be constructed and are included within the scope of the hybrid cells of the present invention. Any other type of cell construction and/or any size of such cells may be used as long as it is compatible with the cell's ingredients.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A primary electrochemical lithium cell, comprising:
an anode comprising metallic lithium therein;
a cathode comprising a current collector and both a liquid $SO_2$ cathode and a solid cathode which comprises a cathode material characterized by having a first electromotive force (EMF) when coupled to a metallic lithium anode, the first EMF is greater than a second EMF of a cell having a metallic lithium anode and a single liquid $SO_2$ cathode;

an electrolyte solution comprising at least one ionizable salt dissolved in at least one organic solvent; and a separator disposed between the anode and the solid cathode of the cell.

2. The primary cell according to claim 1, wherein the second EMF is in the range of 2.9-3.1 Volt.

3. The primary cell according to claim 1, wherein the cathode material of the solid cathode is selected from, carbon monofluoride ($CF_X$), a transition metal oxide, a mixture of two or more transition metal oxides and any combinations thereof.

4. The primary cell according to claim 3, wherein the transition metal oxide is selected from the list consisting of $MnO_2$, $CoO_2$, $NiO_2$, $V_2O_5$.

5. The primary cell according to claim 3, wherein the solid cathode comprises a mixture of $CF_X$ with one or more transition metal oxides, and wherein the weight of the $CF_X$ is in the range of 10%-45% of the total weight of the cathode material of the solid cathode.

6. The primary cell according to claim 3, wherein the solid cathode material comprises $CF_X$ and wherein the energy density of the primary cell exceeds 215 Wh/Kg and/or exceeds 395 Wh/liter.

7. The primary cell according to claim 3, wherein the solid cathode material comprises a mixture of $CF_X$ and $MnO_2$ and wherein the energy density of the primary cell exceeds 215 Wh/Kg and/or exceeds 395 Wh/liter.

8. The primary cell according to claim 3, wherein the solid cathode material comprises $MnO_2$ and wherein the energy density of the primary cell exceeds 215 Wh/Kg and/or exceeds 395 Wh/liter.

9. The primary cell according to claim 1, wherein the at least one ionizable salt is selected from LiBr, $LiClO_4$ and any combination thereof.

10. The primary cell according to claim 1, wherein the at least one organic solvent is Acetonitrile (AN).

11. The primary cell according to claim 1, wherein the cell is selected from a "Jelly Roll" type cell, a wafer type cell, a bobbin type cell and a prismatic type cell.

12. The primary cell according to claim 1, wherein the first EMF is in the range of 3.0-4.5 Volt.

13. A method for constructing a primary electrochemical cell, the method comprising the steps of:

providing an anode including a current collector and metallic lithium;

providing a cathode including a current collector and both a liquid $SO_2$ cathode and a cathode material which comprises a solid material characterized by having a first electromotive force (EMF) when coupled to a metallic lithium anode, the first EMF is greater than a second EMF of a cell having a metallic lithium anode and a single liquid $SO_2$ cathode;

inserting the anode and the cathode with a separator interposed therebetween into a canister;

injecting into the canister under vacuum a mixture of liquid $SO_2$, and an electrolyte solution comprising at least one ionizable salt and at least one organic solvent; and hermetically sealing the cell after the step of injecting.

14. The method according to claim 13, wherein the second EMF is in the range of 2.9-3.1 Volt.

15. The method according to claim 14, wherein the cathode material of the solid cathode is selected from, carbon monofluoride ($CF_X$), a transition metal oxide, a mixture of two or more transition metal oxides and any combinations thereof.

16. The method according to claim 15, wherein the transition metal oxide is selected from the list consisting of $MnO_2$, $CoO_2$, $NiO_2$, $V_2O_5$.

17. The method according to claim 15, wherein the solid cathode material comprises $CF_X$ and wherein the energy density of the primary cell exceeds 215 Wh/Kg and/or exceeds 395 Wh/liter.

18. The method according to claim 15, wherein the solid cathode material comprises a mixture of $CF_X$ and $MnO_2$ and wherein the energy density of the primary cell exceeds 215 Wh/Kg and/or exceeds 395 Wh/liter.

19. The method according to claim 15, wherein the solid cathode material comprises $MnO_2$ and wherein the energy density of the primary cell exceeds 215 Wh/Kg and/or exceeds 395 Wh/liter.

20. The method according to claim 13, wherein the first EMF is in the range of 3.0-4.5 Volt.

* * * * *